United States Patent
Schmid et al.

(10) Patent No.: US 11,012,750 B2
(45) Date of Patent: May 18, 2021

(54) METHOD FOR CONFIGURING A MULTIVIEWER AS WELL AS MULTIVIEWER

(71) Applicant: Rohde & Schwarz GmbH & Co. KG, Munich (DE)

(72) Inventors: Bjoern Schmid, Munich (DE); Fadi Moukayed, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 16/190,971

(22) Filed: Nov. 14, 2018

(65) Prior Publication Data

US 2020/0154074 A1 May 14, 2020

(51) Int. Cl.
| | | |
|---|---|---|
| *H04N 5/445* | (2011.01) | |
| *H04N 7/18* | (2006.01) | |
| *G06K 9/62* | (2006.01) | |
| *H04N 21/47* | (2011.01) | |
| *H04N 21/431* | (2011.01) | |

(52) U.S. Cl.
CPC ......... *H04N 21/47* (2013.01); *G06K 9/6215* (2013.01); *H04N 7/181* (2013.01); *H04N 21/4316* (2013.01)

(58) Field of Classification Search
None
See application file for complete search history.

(56) References Cited

U.S. PATENT DOCUMENTS

| | | | | |
|---|---|---|---|---|
| 8,368,757 | B2 * | 2/2013 | Graser | A62C 3/0271 348/143 |
| 9,031,872 | B1 * | 5/2015 | Foster | G06F 3/147 340/5.91 |
| 9,571,791 | B1 * | 2/2017 | Castellani | H04M 3/567 |
| 10,182,270 | B2 * | 1/2019 | Kim | H04N 21/485 |
| 10,305,895 | B2 * | 5/2019 | Barry | H04L 63/0861 |
| 10,592,667 | B1 * | 3/2020 | Long | G06F 21/565 |
| 2002/0112242 | A1 * | 8/2002 | Meddaugh | H04N 5/268 725/78 |
| 2004/0263625 | A1 * | 12/2004 | Ishigami | G08B 13/19608 348/152 |
| 2005/0193015 | A1 * | 9/2005 | Logston | G06F 16/44 |

(Continued)

OTHER PUBLICATIONS

IP.Com search report.*
Search Report IP.com.*

*Primary Examiner* — Mohammad J Rahman
(74) *Attorney, Agent, or Firm* — Christensen O'Connor Johnson Kindness PLLC

(57) ABSTRACT

A method for configuring a multiviewer of at least one service having at least one sensor providing a sensor signal, comprising: specifying at least one characteristic feature, extracting for each of the at least one sensor signals at least one characteristic feature vector representing at least the at least one characteristic feature of the sensor signal, and arranging the sensors signals in a two-dimensional matrix in such a manner that a distance is minimized, the distance being the distance between at least one characteristic feature vector of one of the sensor signals and the corresponding characteristic feature vector of at least one neighboring sensor signal, the at least one neighboring sensor signal being an adjacent neighbor to the one sensor signal in the matrix. Further, a multiviewer is shown.

20 Claims, 2 Drawing Sheets

(56) References Cited

U.S. PATENT DOCUMENTS

| | | | |
|---|---|---|---|
| 2006/0056810 A1* | 3/2006 | Kelly | H04N 5/4401 386/230 |
| 2009/0132942 A1* | 5/2009 | Santoro | G06F 3/0481 715/765 |
| 2009/0235169 A1* | 9/2009 | Cheng | H04N 7/181 715/719 |
| 2010/0060552 A1* | 3/2010 | Watanabe | G02B 27/017 345/8 |
| 2010/0094855 A1* | 4/2010 | Rouhani-Kalleh | G06F 16/3325 707/706 |
| 2010/0095326 A1* | 4/2010 | Robertson, III | H04N 7/17318 725/40 |
| 2011/0194620 A1* | 8/2011 | Tsai | H04N 5/4403 375/240.26 |
| 2011/0252383 A1* | 10/2011 | Miyashita | G06F 3/044 715/863 |
| 2012/0045197 A1* | 2/2012 | Jones | G03B 17/02 396/427 |
| 2012/0050524 A1* | 3/2012 | Rinner | G06T 3/40 348/117 |
| 2012/0050525 A1* | 3/2012 | Rinner | G06T 7/33 348/117 |
| 2012/0069049 A1* | 3/2012 | Howe | G06K 9/00134 345/629 |
| 2012/0179999 A1* | 7/2012 | Nesladek | G06F 3/0488 715/835 |
| 2012/0222540 A1* | 9/2012 | Usui | G10H 1/0025 84/622 |
| 2012/0313987 A1* | 12/2012 | Nakamura | G09G 3/3426 345/694 |
| 2013/0127984 A1* | 5/2013 | Grecu | H04N 5/23238 348/36 |
| 2013/0194299 A1* | 8/2013 | Saarinen | G05B 23/0216 345/629 |
| 2013/0243406 A1* | 9/2013 | Kirby | H04N 5/76 386/326 |
| 2013/0250036 A1* | 9/2013 | Rosenberg | H04N 7/152 348/14.09 |
| 2013/0339039 A1* | 12/2013 | Roman | G06Q 10/0875 705/2 |
| 2014/0049489 A1* | 2/2014 | Chen | G06F 3/04886 345/173 |
| 2014/0050455 A1* | 2/2014 | Ni | H04N 9/8227 386/224 |
| 2014/0126828 A1* | 5/2014 | Brandys | G06F 3/04847 382/201 |
| 2014/0178033 A1* | 6/2014 | He | G08B 13/19669 386/230 |
| 2014/0267549 A1* | 9/2014 | Pinter | H04N 5/77 348/14.03 |
| 2014/0267905 A1* | 9/2014 | Lee | H04N 21/4316 348/462 |
| 2014/0282706 A1* | 9/2014 | Kim | H04N 21/439 725/33 |
| 2014/0320516 A1* | 10/2014 | Son | G06F 3/04817 345/589 |
| 2015/0109407 A1* | 4/2015 | Giger | G01S 17/46 348/36 |
| 2015/0113426 A1* | 4/2015 | Okubo | H04W 4/90 715/744 |
| 2015/0135234 A1* | 5/2015 | Hall | H04N 21/4316 725/59 |
| 2015/0156415 A1* | 6/2015 | Gallup | H04N 5/347 348/36 |
| 2015/0172775 A1* | 6/2015 | Yee | H04N 21/485 725/37 |
| 2015/0195489 A1* | 7/2015 | Sobti | H04N 7/142 348/14.08 |
| 2015/0201149 A1* | 7/2015 | Shih | H04N 7/181 348/159 |
| 2015/0301785 A1* | 10/2015 | Nagahiro | G06T 3/40 345/2.2 |
| 2016/0012297 A1* | 1/2016 | Kanga | G06K 9/00771 382/103 |
| 2016/0034477 A1* | 2/2016 | Mao | G06K 9/00758 386/353 |
| 2016/0092056 A1* | 3/2016 | Yang | H04N 7/181 348/143 |
| 2016/0098963 A1* | 4/2016 | Kim | G09G 3/3406 345/690 |
| 2016/0225184 A1* | 8/2016 | Vlemmix | G06F 3/0488 |
| 2016/0227269 A1* | 8/2016 | Han | H04N 21/47205 |
| 2016/0260015 A1* | 9/2016 | Lucey | G06K 9/00724 |
| 2016/0308859 A1* | 10/2016 | Barry | H04L 63/0861 |
| 2017/0041592 A1* | 2/2017 | Hwang | G06F 3/013 |
| 2017/0127045 A1* | 5/2017 | Lin | H04N 5/23238 |
| 2017/0150139 A1* | 5/2017 | Lee | H04N 13/356 |
| 2017/0160799 A1* | 6/2017 | Shi | G06F 3/013 |
| 2017/0163781 A1* | 6/2017 | Seshan | B32B 27/08 |
| 2017/0186209 A1* | 6/2017 | Butcher | G06F 3/0412 |
| 2017/0223430 A1* | 8/2017 | Kim | H04N 21/485 |
| 2017/0235436 A1* | 8/2017 | Hooton | G06F 3/0486 705/7.11 |
| 2017/0235439 A1* | 8/2017 | Lu | G06F 3/0482 715/812 |
| 2018/0014062 A1* | 1/2018 | Turi | H04N 21/4312 |
| 2018/0027179 A1* | 1/2018 | Matsuzaki | G06K 9/00805 348/38 |
| 2018/0165554 A1* | 6/2018 | Zhang | G06K 9/6269 |
| 2018/0176474 A1* | 6/2018 | Blanco | G06F 40/169 |
| 2018/0260031 A1* | 9/2018 | Lin | G06F 3/017 |
| 2018/0262683 A1* | 9/2018 | Meler | G06T 3/4038 |
| 2018/0357981 A1* | 12/2018 | Ng | G09G 5/12 |
| 2018/0367860 A1* | 12/2018 | Schmidt | H04N 21/4821 |
| 2019/0003984 A1* | 1/2019 | Kester | G01J 3/2823 |
| 2019/0014261 A1* | 1/2019 | Gong | H04N 5/23238 |
| 2019/0049486 A1* | 2/2019 | Godec-Schonbacher | G01Q 30/025 |
| 2019/0068685 A1* | 2/2019 | He | G06F 3/04842 |
| 2020/0073877 A1* | 3/2020 | Winter | G06K 9/00771 |

\* cited by examiner

METHOD FOR CONFIGURING A MULTIVIEWER AS WELL AS MULTIVIEWER

FIELD OF THE DISCLOSURE

The disclosure is generally directed to methods for configuring a multiviewer of at least one service as well as a multiviewer for visualizing at least one service.

BACKGROUND

Multiviewers are known in the art and are used to visualize simultaneously the information or signals provided by a plurality of services and/or a plurality of sensors.

For example, a broadcasting service may have different sensors in form of different cameras, for example when broadcasting a sports event. Each of the cameras provides a video signal or video stream that has to be monitored by the director of the transmission to choose the best video for broadcasting. Multiviewers also have application in monitoring services.

In order to operate a multiviewer efficiently and easily, the visualized signals of the sensors, e.g. the different pictures of the video transmission, have to be grouped and arranged in such a manner that sensor signals having similar properties are close to one another.

This configuration has to be done manually by the user of the multiviewer and is a tedious and time-consuming task.

SUMMARY

Thus, there is the need for providing a method for configuring a multiviewer that arranges the sensor signals automatically.

For this purpose or others, a method is provided for configuring a multiviewer of at least one service being an audio service, a video and/or a data service, the at least one service having at least one sensor providing a sensor signal. The method comprises specifying at least one characteristic feature,
- extracting for each of the at least one sensor signal at least one characteristic feature vector representing at least the at least one characteristic feature of the sensor signal,
- arranging the sensors signals in a two-dimensional matrix in such a manner that a distance is minimized, the distance being the distance between at least one characteristic feature vector of one of the sensor signals and the corresponding characteristic feature vector of at least one neighboring sensor signal, the at least one neighboring sensor signal being an adjacent neighbor to the one sensor signal in the matrix.

In this disclosure, a feature vector may also comprise only a single (characteristic) feature.

By arranging the sensor signals based on the distance of the characteristic feature vectors, a fail-safe method for automatic arrangement of the sensor signals is provided so that the configuration can be performed automatically. Thus, the time necessary for configuring the multiviewer is reduced drastically.

The multiviewer may be a visualization system and/or a monitoring system. In addition or in the alternative, the characteristic feature may be specified manually by the user or automatically by the multiviewer based on the sensor signals.

For example, the distance is determined using a Euclidian vector distance function and/or a Manhattan distance function. Thus, the distance can be calculated reliably.

In order to further improve the arrangement results, a sum of the distances of all sensor signals with all of their adjacent neighbors in the matrix is minimized.

In an aspect of the disclosure, the adjacent neighbors are adjacent on an upper side, a lower side, a right side and/or a left side of the one sensor signal. This way, the arrangement can be optimized further. In some embodiments, sensor signals that are the next sensor signals in a diagonal direction are not considered adjacent neighbors.

In an embodiment, the at least one sensor is a probe and/or a source. The source is, for example, a video source, an audio source, an audio-video-source or a source for a still image. This way, the multiviewer may be used for a variety of purposes.

In order to group and arrange the sensor signal qualitatively, the at least one characteristic feature vector is based on and/or includes at least one of the following properties of the sensor signal: color of transmitted image, subtitles, bit rate, data rate, quality, media type, meta data, type of service, type of sensor, transmission standard, name of service and origin of service. The origin of the service may include a URL.

In an embodiment of the disclosure, the extracting, the arranging and/or the minimizing is carried out by a stochastic optimization algorithm. This way, a high level of control over these processing steps is achieved.

For a very robust process, the extracting, the arranging and/or the minimizing may be carried out by simulated annealing.

Very precise results are achieved if the extracting, the arranging and/or the minimizing is carried out by an artificial neural network.

The artificial neural network is, for example, a self-organizing map leading to a very efficient method. Of course, other artificial neural networks using competitive learning may be used.

In another aspect of the disclosure, the resulting matrix represents a logical grouping of the sensor signals according to the specified at least one characteristic feature. This grouping allows easier analysis.

In another embodiment, the resulting matrix is used for the configuration of a visualization in a monitoring output, a web based user interface and/or any other suitable means for interfacing with the user, leading to a better reception of the information by the user. The result may be visualized as matrix or in lists.

In yet another embodiment, the resulting matrix is used as an input for at least one further processing stage. This way, the further processing may be enhanced.

The at least one further processing stage may include an aggregation of monitoring data, visual inspection through an operator and/or a further analysis algorithm. Thus, these processes may be simplified.

For the above purpose, one or more embodiments of a multiviewer is further provided for visualizing at least one service being an audio service, a video and/or a data service, the at least one service having at least one sensor providing a sensor signal. In some embodiments, the multiviewer comprises a control unit configured to:
- specify at least one characteristic feature or receive a characteristic feature specified by a user, extract for each of the at least one sensor signal at least one characteristic feature vector representing at least the at least one characteristic feature of the sensor signal, arrange the sensor signals in a two-dimensional matrix in such a manner that a distance is minimized, the distance being the distance between at least one characteristic feature vector of one of the sensor signals and the corresponding characteristic feature vector of at least one neighboring sensor signal, the at least one neighboring sensor signal being an adjacent neighbor to the one sensor signal in the matrix.

The features and benefits discussed with respect to the method also apply to the multiviewer.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
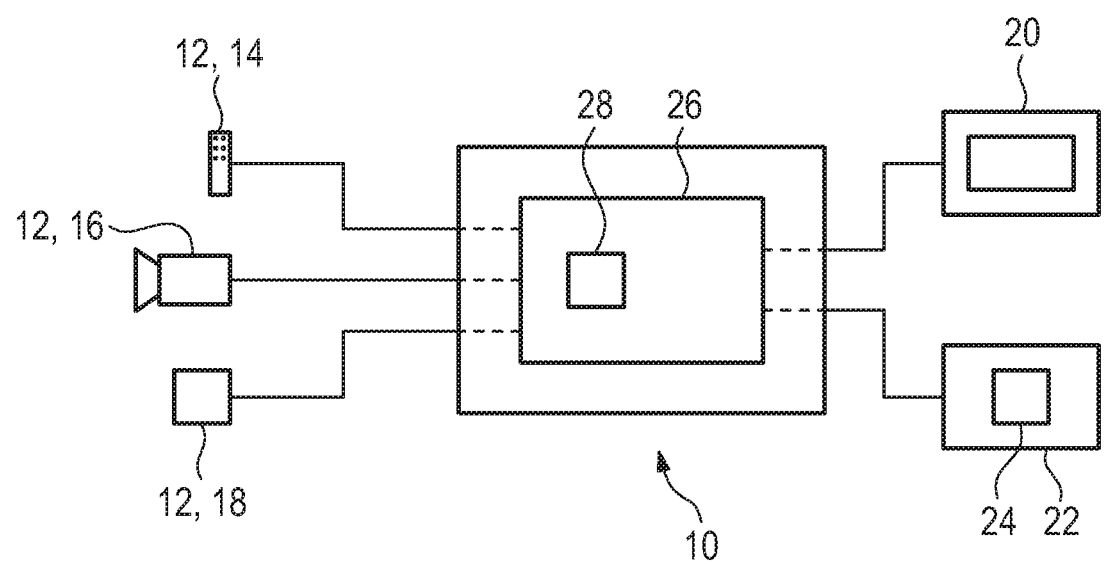
FIG. 1 shows a multiviewer according to the disclosure schematically.

FIG. 1 shows schematically a multiviewer 10. The multiviewer 10 is for example a visualization system and/or a monitoring system for visualizing or monitoring different services transmitting audio, video and/or data signals, called audio service, video service and data service, respectively, in the following.

The multiviewer 10 is connected to a plurality of services each having at least one sensor 12. Further, the multiviewer 10 is connected to a display device 20 and a further processing stage 22. In the shown embodiment, the multiviewer 10 is connected to three sensors 12. Each sensor 12 symbolizes a different service. However, a service may have more than one sensor 12.

In the shown embodiment, one of the sensors 12 is a probe 14, like a microphone. The microphone provides an audio signal or a stream of audio signals so that the corresponding service is an audio service.

Another sensor 12 is a video source 16, like a camera providing a video signal or a still image and, optionally, a corresponding audio signal. Thus, the associated service is a video service.

The third sensor 12 shown in the example of FIG. 1 is a data storage device 18 having stored audio, video and/or data recordings. For example, the data storage device 18 transmits a data signal to the multiviewer 10. Thus, the data storage device 18 may be part of a data service and seen as a data source. Of course, the storage 18 may also function as an audio source or a video source.

Each of the sensor signals A1-C3 (see FIG. 2) received by the multiviewer 10 from the sensors 12 has specific characteristics, like the color of the transmitted image, subtitles, bit rate, data rate, quality, media type, meta data, type of service, type of sensor, transmission standard, name of service and the origin of service, like a URL. For the sake of simplicity, in this disclosure, the term "sensor signal" is used to describe properties of the physical sensor 12 as well as features with respect to the signal originating from the very sensor 12.

The display device 20 may be part of a monitoring output, a display for displaying a web-based user interface or a display for any other means for interfacing with a user.

The further processing stage 22 may be a physical component comprising an analysis module 24 for aggregating monitoring data, for visual inspecting incoming data by an operator and/or for processing with a further analysis algorithm. The further processing stage may also be a logical method step.

Figure 2:
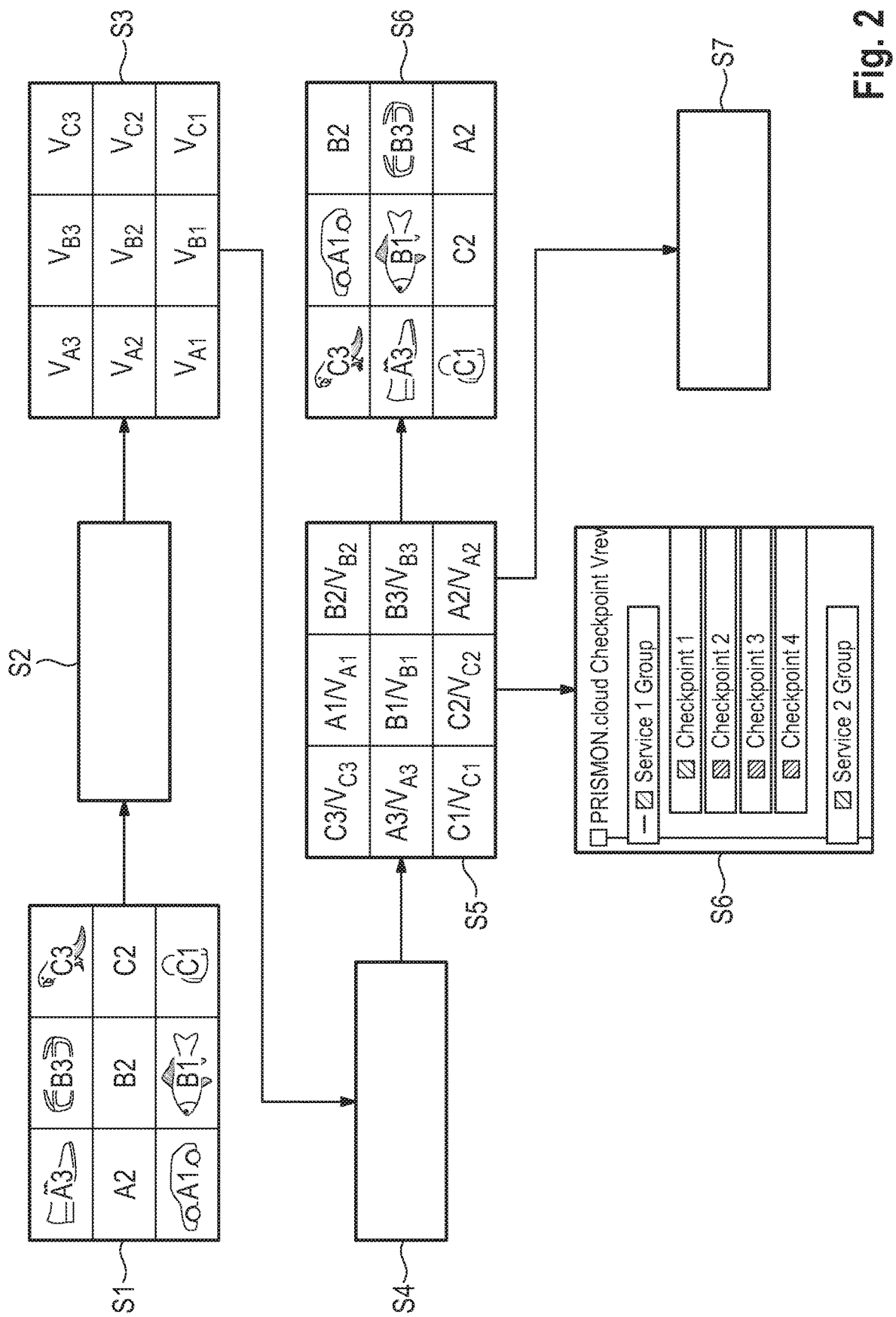
FIG. 2 shows an illustration of a method according to the disclosure.

Further, the multiviewer 10 itself comprises at least one control unit 26 for controlling the function of the multiviewer 10. In the shown embodiment, the control unit 26 has an artificial neural network 28. In some embodiments, the control unit 26 is configured to perform the following method for configuring the multiviewer 10. The method is illustrated in FIG. 2.

In the shown example, the multiviewer 10 receives nine different sensor signals A1, A2, A3, B1, B2, B3, C1, C2 and C3 (step S1). The sensor signals A1-C3 are shown in a two-dimensional three by three matrix for illustration purposes only. However, the sensor signals A1-C3 do not necessarily have a given order or arrangement at the beginning of the method. As a default arrangement, the sensor signals A1-C3 may be arranged according to order of the physical inputs used at the multiviewer 10.

In order to configure the multiviewer 10 correctly, the sensor signals A1-C3 have to be arranged in specific way, e.g. according to properties of their content. For arranging the sensor signals A1-C3, at least one feature of the sensor signals A1-C3 is specified as a characteristic feature. This characteristic feature may be chosen by the user of the multiviewer 10 and/or the control unit 26 determines the at least one specific feature automatically (step S2).

Based on the at least one specific feature, for each of the sensor signals A1-C3 a characteristic feature vector $V_{A1}$-$V_{C3}$ is extracted from the sensor signals A1-C3 by the control unit 26 (step S3). As can be seen on the upper right hand of FIG. 2, the characteristic feature vectors $V_{A1}$-$V_{C3}$ are arranged in the same manner in a two-dimensional three by three matrix as their corresponding sensor signals A1-C3.

In this arrangement, each of the sensor signals A1-C3 and therefore of the characteristic feature vectors $V_{A1}$-$V_{C3}$ has several adjacent neighbors. In this disclosure, an adjacent neighbor is a characteristic feature vector $V_{A1}$-$V_{C3}$ adjacent to the characteristic feature vector $V_{A1}$-$V_{C3}$ in question on its upper side, its lower side, its right hand side or its left hand side. Characteristic feature vectors $V_{A1}$-$V_{C3}$ lying diagonally next to the characteristic feature vector $V_{A1}$-$V_{C3}$ in question are not considered adjacent neighbors. For example, the neighboring characteristic feature vectors of the characteristic feature vector $V_{B1}$ are the characteristic feature vectors $V_{A1}$, $V_{B2}$ and $V_{C1}$.

For grouping the sensor signals A1-C3 according to the specified characteristic feature, for each characteristic feature vector $V_{A1}$-$V_{C3}$ and thus for each sensor signal A1-C3, the distance D to its adjacent neighbors is calculated (step S4).

The distance D is, for example, determined using the Euclidean vector distance function or the Manhattan distance function. Also the sum E of all distances D is determined. The sum E is the sum of distances D for each characteristic feature vector $V_{A1}$-$V_{C3}$ to all of its adjacent neighbors. Mathematically, the sum E may be expressed generally for a matrix of N×M characteristic feature vectors V as:

$$E = \sum_{i=1}^{N} \sum_{j=1}^{M} D(V_{i,j}, V_{i-1,j}) + D(V_{i,j}, V_{i,j+1})$$

wherein D(x, y) is the distance function yielding the corresponding distance D.

In the next step S5, the characteristic feature vectors $V_{A1}$-$V_{C3}$ and thus the sensor signals A1-C3 are arranged in a two-dimensional matrix, in the shown embodiment a three by three matrix. The arrangement is such that the sum E is minimized, in particular such that the sum E obtains its global minimum value.

The arrangement of the characteristic feature vectors $V_{A1}$-$V_{C3}$ (and sensor signals A1-C3) and the minimization of the sum E as well as, optionally, the extraction of the characteristic feature vectors $V_{A1}$-$V_{C3}$ may be done by the control unit 26 using a stochastic optimization algorithm, simulated annealing or the artificial neural network 28 (FIG. 1) of the control unit 26. The artificial neural network 28 may be an artificial neural network based on competitive learning, for example a self-organizing map.

The matrix resulting from the arrangement in step S5, i.e. the resulting matrix, is illustrated in the center of FIG. 2 and represents a logical grouping of the sensor signals A1-C3 associated with the characteristic features vectors $V_{A1}$-$V_{C3}$ with respect to the specified at least one characteristic feature.

The sensor signals A1-C3 may then be grouped according to the resulting matrix. The sensor signals A1-C3 grouped in this manner are then, for example, transmitted to the display device 20 and displayed to the user, as illustrated in the middle right hand side of FIG. 2 (step S6).

As can be seen at the bottom of FIG. 2, the arranged sensor signals A1-C3, i.e. the resulting matrix, can also be visualized at the display device 20 as a list.

Further, in the shown embodiment, the resulting matrix—and thus the arranged sensor signals A1-C3—is transmitted to the further processing stage 22 in step S7 and used as an input for the further processing stage 22.

In the further processing stage 22, the sensor signals A1-C3 may be aggregated, visual inspected by an operator or further processed by another analysis algorithm.

Thus, the multiviewer 10 is configured automatically—either fully automatically or once a characteristic feature has been specified—to group similar sensor signals A1-C3 close to one another so that the tedious and manual process of configuring the multiviewer 10 has been simplified.

It should also be understood that each block of the block diagrams and flowchart illustrations, and combinations of blocks in the block diagrams and flowchart illustrations described herein and/or illustrated in the FIGURES, could be implemented by special purpose hardware-based computer systems that perform the specified functions or operations, or combinations of special purpose hardware and computer instructions.

It should be understood that each block of any of the block diagrams and flowchart illustrations, respectively, and described herein and/or illustrated in the FIGURES may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks. The term computer can include any processing structure, including but not limited to a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof.

In an embodiment, the processing stage(s), control unit, etc., includes a microprocessor and a memory storing logic modules and/or instructions for carrying out the function(s) of these components, either separately or in any combination. In an embodiment, the processing stage(s), control unit, etc., includes one or more ASICs having a plurality of predefined logic components. In an embodiment, the processing stage(s), control unit, etc., includes one or more FPGA having a plurality of programmable logic components. In an embodiment, the processing stage(s), control unit, etc., includes hardware circuit implementations (e.g., implementations in analog circuitry, implementations in digital circuitry, and the like, and combinations thereof). In an embodiment, the the processing stage(s), control unit, etc., includes combinations of circuits and computer program products having software or firmware instructions stored on one or more computer readable memories that work together to cause a device to perform one or more methodologies or technologies described herein.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method for configuring a multiviewer of at least one service being at least one of an audio service, a video service and a data service, said at least one service having at least one sensor providing a sensor signal, said method comprising:
   specifying at least one characteristic feature;
   extracting for each of said at least one sensor signal at least one characteristic feature vector representing at least said at least one characteristic feature of said sensor signal;
   arranging said sensors signals in a two-dimensional matrix in such a manner that a distance is minimized, said distance being the distance between at least one characteristic feature vector of one of said sensor signals and said corresponding characteristic feature vector of at least one neighboring sensor signal, said at least one neighboring sensor signal being an adjacent neighbor to said one sensor signal in said matrix; and
   displaying said sensor signals arranged in the two-dimensional matrix on a display device in said two-dimensional matrix.

2. The method according to claim 1, wherein said distance is determined using at least one of a Euclidian vector distance function and a Manhattan distance function.

3. The method according to claim 1, wherein a sum of said distances of all sensor signals with all of their adjacent neighbors in said matrix is minimized.

4. The method according to claim 1, wherein said adjacent neighbors are adjacent on at least one of an upper side, a lower side, a right side and a left side of said one sensor signal.

5. The method according to claim 1, wherein said at least one sensor is at least one of a probe and a source.

6. The method according to claim 1, wherein said at least one characteristic feature vector is based on and/or includes at least one of the following properties of said sensor signal: color of transmitted image, subtitles, bit rate, data rate, quality, media type, meta data, type of service, type of sensor, transmission standard, name of service and origin of service.

7. The method according to claim 1, wherein at least one of said extracting, said arranging and said minimizing is carried out by a stochastic optimization algorithm.

8. The method according to claim 1, wherein at least one of said extracting, said arranging and said minimizing is carried out by simulated annealing.

9. The method according to claim 1, wherein at least one of said extracting, said arranging and said minimizing is carried out by an artificial neural network.

10. The method according to claim 9, wherein said artificial neural network is a self-organizing map.

11. The method according to claim 1, wherein said resulting matrix represents a logical grouping of said sensor signals according to said specified at least one characteristic feature.

12. The method according to claim 1, wherein said resulting matrix is used for the configuration of at least one of a visualization in a monitoring output, a web based user interface and any other suitable means for interfacing with the user.

13. A multiviewer for visualizing at least one service being at least one of an audio service, a video service and a data service, said at least one service having at least one sensor providing a sensor signal, comprising a control unit configured to:
   specify at least one characteristic feature or receive a characteristic feature specified by a user;
   extract for each of said at least one sensor signal at least one characteristic feature vector representing at least said at least one characteristic feature of said sensor signal;
   arrange said sensor signals in a two-dimensional matrix in such a manner that a distance is minimized, said distance being the distance between at least one characteristic feature vector of one of said sensor signals and said corresponding characteristic feature vector of at least one neighboring sensor signal, said at least one neighboring sensor signal being an adjacent neighbor to said one sensor signal in said matrix; and
   transmit said arranged sensor signals to a display device for displaying said sensor signals arranged in said two-dimensional matrix.

14. The multiviewer according to claim 13, wherein said multiviewer is at least one of a visualization system and a monitoring system.

15. The multiviewer according to claim 13, wherein said control unit is configured to arrange said sensors signals automatically in said two-dimensional matrix.

16. The multiviewer according to claim 13, wherein said control unit is configured to arrange said characteristic feature vectors in a two-dimensional matrix in such a manner that a distance is minimized, said distance being the distance between adjacent neighbors of said at least one characteristic feature vectors in said two-dimensional matrix.

17. The method according to claim 1, wherein said sensors signals are arranged automatically in said two-dimensional matrix.

18. The method according to claim 1, wherein said characteristic feature vectors are arranged in a two-dimensional matrix in such a manner that a distance is minimized, said distance being the distance between adjacent neighbors of said at least one characteristic feature vectors in said two-dimensional matrix.

19. The method according to claim 1, wherein the sensor signals are displayed discretely from one another.

20. The method according to claim 1, wherein at least one of the at least one service provides a stream of data.

* * * * *